(12) United States Patent
Seo et al.

(10) Patent No.: US 11,159,276 B2
(45) Date of Patent: Oct. 26, 2021

(54) METHOD AND DEVICE FOR TRANSMITTING FEEDBACK INFORMATION IN WIRELESS COMMUNICATION SYSTEM

(71) Applicant: LG Electronics Inc., Seoul (KR)

(72) Inventors: Hanbyul Seo, Seoul (KR); Youngdae Lee, Seoul (KR); Jaewook Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 60 days.

(21) Appl. No.: 16/606,522

(22) PCT Filed: Apr. 19, 2018

(86) PCT No.: PCT/KR2018/004546
§ 371 (c)(1),
(2) Date: Oct. 18, 2019

(87) PCT Pub. No.: WO2018/194388
PCT Pub. Date: Oct. 25, 2018

(65) Prior Publication Data
US 2020/0127768 A1    Apr. 23, 2020

Related U.S. Application Data

(60) Provisional application No. 62/487,416, filed on Apr. 19, 2017.

(51) Int. Cl.
*H04L 1/18* (2006.01)
*H04L 5/00* (2006.01)
(Continued)

(52) U.S. Cl.
CPC ......... *H04L 1/1812* (2013.01); *H04B 7/0626* (2013.01); *H04L 5/0055* (2013.01);
(Continued)

(58) Field of Classification Search
CPC ............... H04L 1/00; H04L 1/18; H04L 5/00
See application file for complete search history.

(56) References Cited

U.S. PATENT DOCUMENTS

2009/0161654 A1* 6/2009 Cai ...................... H04B 7/2681
370/350
2016/0345312 A1 11/2016 Kim et al.
(Continued)

FOREIGN PATENT DOCUMENTS

EP            2922366        9/2015
KR         20110134853      12/2011
(Continued)

OTHER PUBLICATIONS

Extended European Search Report in European Application No. 18787812.9, dated Mar. 10, 2020, 8 pages.

*Primary Examiner* — Joshua L Schwartz
(74) *Attorney, Agent, or Firm* — Fish & Richardson P.C.

(57) ABSTRACT

Provided according to an embodiment is a method for transmitting feedback information in a wireless network supporting a downlink and a sidelink. Specifically, the method comprises the steps of: receiving, by a remote terminal, downlink data from a base station through the downlink; and transmitting, by the remote terminal, feedback information associated with the downlink data to a relay terminal through the sidelink. The downlink data may be received by the remote terminal through at least one of downlink subframes preceding an (n-k)th subframe, where n and k each denote an arbitrary positive integer. The feedback information associated with the downlink data may be generated by the remote terminal in the (n-k)th subframe. The feedback information associated with the downlink data may be transmitted to the relay terminal by the remote terminal in an nth subframe.

16 Claims, 21 Drawing Sheets

(51) Int. Cl.
*H04W 72/04* (2009.01)
*H04W 4/40* (2018.01)
*H04W 88/06* (2009.01)
*H04B 7/06* (2006.01)

(52) U.S. Cl.
CPC .......... *H04W 72/0446* (2013.01); *H04W 4/40* (2018.02); *H04W 88/06* (2013.01)

(56) References Cited

U.S. PATENT DOCUMENTS

2017/0331670 A1* 11/2017 Parkvall .............. H04L 41/0233
2019/0089498 A1* 3/2019 Pelletier ................ H04L 5/0053

FOREIGN PATENT DOCUMENTS

| | | |
|---|---|---|
| KR | 20140030322 | 3/2014 |
| KR | 20140038275 | 3/2014 |
| KR | 20160110959 | 9/2016 |
| WO | WO2017026970 | 2/2017 |

\* cited by examiner

FIG. 13

| HARQ process ID | A/N info. | HARQ process ID | A/N info. | ⋯ | HARQ process ID | A/N info. |

METHOD AND DEVICE FOR TRANSMITTING FEEDBACK INFORMATION IN WIRELESS COMMUNICATION SYSTEM

CROSS-REFERENCE TO RELATED APPLICATIONS

This application is a National Stage application under 35 U.S.C. § 371 of International Application No. PCT/KR2018/004546, filed on Apr. 19, 2018, which claims the benefit of U.S. Provisional Application No. 62/487,416 filed on Apr. 19, 2017. The disclosures of the prior applications are incorporated by reference in their entirety.

BACKGROUND

Field

The present disclosure relates to a wireless communication system, and more particularly, to a method and a device for transmitting feedback information in a wireless communication system.

Related Art

In International Telecommunication Union Radio communication sector (ITU-R), a standardization task for International Mobile Telecommunication (IMT)-Advanced, that is, the next-generation mobile communication system since the third generation, is in progress. IMT-Advanced sets its goal to support Internet Protocol (IP)-based multimedia services at a data transfer rate of 1 Gbps in the stop and slow-speed moving state and of 100 Mbps in the fast-speed moving state.

For example, $3^{rd}$ Generation Partnership Project (3GPP) is a system standard to satisfy the requirements of IMT-Advanced and is preparing for LTE-Advanced improved from Long Term Evolution (LTE) based on Orthogonal Frequency Division Multiple Access (OFDMA)/Single Carrier-Frequency Division Multiple Access (SC-FDMA) transmission schemes. LTE-Advanced is one of strong candidates for IMT-Advanced.

There is a growing interest in a Device-to-Device (D22) technology in which devices perform direct communication. In particular, D2D has been in the spotlight as a communication technology for a public safety network. A commercial communication network is rapidly changing to LTE, but the current public safety network is basically based on the 2G technology in terms of a collision problem with existing communication standards and a cost. Such a technology gap and a need for improved services are leading to efforts to improve the public safety network.

The public safety network has higher service requirements (reliability and security) than the commercial communication network. In particular, if coverage of cellular communication is not affected or available, the public safety network also requires direct communication between devices, that is, D2D operation.

D2D operation may have various advantages in that it is communication between devices in proximity. For example, D2D UE has a high transfer rate and a low delay and may perform data communication. Furthermore, in D2D operation, traffic concentrated on a base station can be distributed. If D2D UE plays the role of a relay, it may also play the role of extending coverage of a base station.

The above-described D2D communication may be expanded and applied to signal transmission and/or reception between vehicles. Most particularly, vehicle-related communication is referred to as vehicle-to-everything (V2X) communication.

In V2X, the term 'X' may refer to a pedestrian, a vehicle, an infrastructure/network, and so on, which may be respectively indicated as V2P, V2V, and V2I/N.

Meanwhile, a wireless communication system may transmit signals by using semi-persistent scheduling (SPS). Herein, semi-persistent scheduling (SPS) corresponds to a scheduling method that first determines in advance a cycle period for transmitting a signal through a higher layer signal and then transmits a signal by using a modulation and coding scheme (MCS), a resource, and so on, which are indicated by a control channel according to the pre-determined cycle period, while directing (or instructing) activation of SPS through the control channel when announcing (or notifying) a specific resource. The signal transmission according to the above-described SPS may also be used in the V2X communication.

Meanwhile, a device-to-device direct link may also be referred to as a sidelink. Both a dynamic method and a semi-persistent method may be used as the scheduling method in a sidelink.

SUMMARY

The present disclosure provides a technique of transmitting feedback information of improved performance.

This specification provides a technique of transmitting a signal in a wireless network supporting a downlink and a sidelink.

In an aspect, provided is a method including: receiving, by a remote terminal, downlink data from a base station through the downlink; and transmitting, by the remote terminal, feedback information related with the downlink data to a relay terminal through the sidelink.

In this case, the downlink data may be received by the remote terminal through at least one of downlink subframes preceding an (n-k)th subframe, where n and k each may denote an arbitrary positive integer.

Further, the feedback information related with the downlink data may be generated by the remote terminal in the (n-k)th subframe.

Further, the feedback information related with the downlink data may be transmitted to the relay terminal by the remote terminal in an nth subframe.

One example of the present disclosure proposes a technique that may effectively transfer feedback information even when links among respective entities are not symmetrically configured.

BRIEF DESCRIPTION OF THE DRAWINGS

FIG. 13 illustrates one example of feedback information configured based on an HARQ process ID.

DESCRIPTION OF EXEMPLARY EMBODIMENTS

The present disclosure provides a method and apparatus for transmitting control information in a wireless communication system supporting vehiclerier aggregation (CA) in a wireless communication system. For clarity, the following description will be based on 3GPP LTE supporting vehiclerier aggregation (CA) and its evolution, but the present disclosure is not limited thereto.

Long Term Evolution (LTE) by the 3rd Generation Partnership Project (3GPP) standardization organization is part of Evolved-UMTS (E-UMTS) using the Evolved-Universal Terrestrial Radio Access Network (E-UTRAN), and adopts Orthogonal Frequency Division Multiple Access (OFDMA) in downlink and adopts Single Vehiclerier-Frequency Division Multiple Access (SC-FDMA) in uplink. LTE-A (Advanced) is the evolution of LTE.

Figure 1:
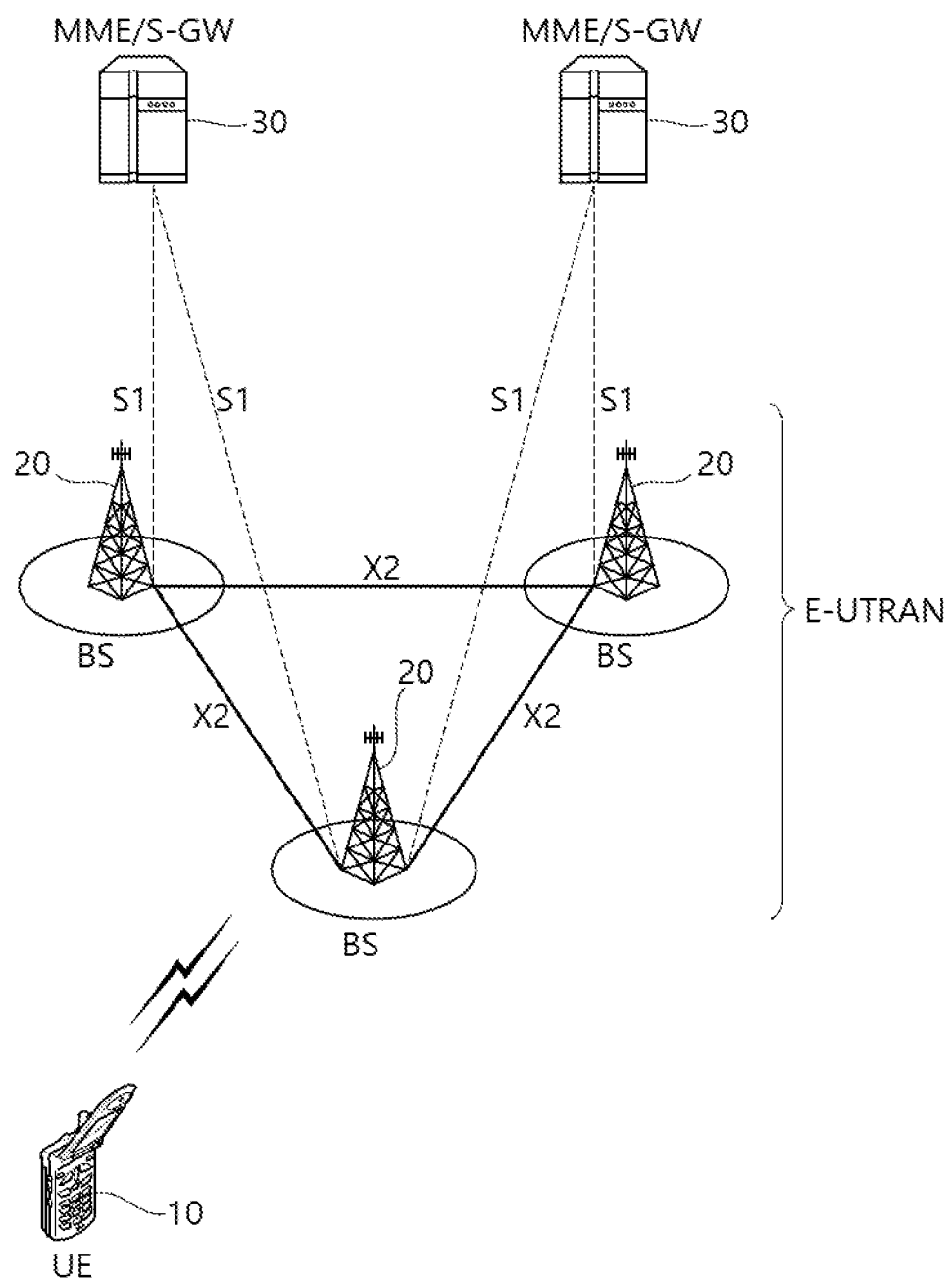
FIG. 1 illustrates a wireless communication system.

FIG. 1 shows a wireless communication system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MIME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Hereinafter, technical features applied to layers are explained.

Figure 2:
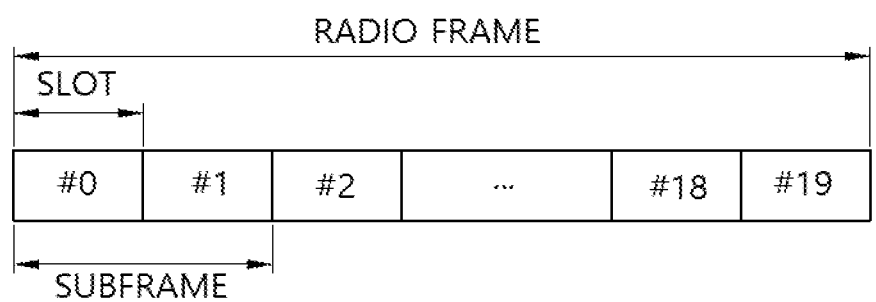
FIG. 2 illustrates a radio frame structure.

FIG. 2 shows the structure of a radio frame.

Referring to FIG. 2, the radio frame includes 10 subframes, and one subframe includes two slots. The length of one subframe may be 1 ms, and the length of one slot may be 0.5 ms. The time that it takes to transmit one subframe is called a Transmission Time Interval (TTI). The TTI may be a minimum scheduling unit.

One slot may include a plurality of Orthogonal Frequency Division Multiplexing (OFDM) symbols in the time domain. The OFDM symbol is used to represent one symbol period because 3GPP LTE uses OFDMA in downlink and may be called another terminology according to a multiple access scheme. For example, if SC-FDMA is used as an uplink multiple access scheme, corresponding symbols may be called SC-FDMA symbols. One slot is illustrated as including 7 OFDM symbols, but the number of OFDM symbols included in one slot may be changed depending on the length of a Cyclic Prefix (CP). In accordance with 3GPP TS 36.211 V8.5.0 (2008-December), 1 subframe includes 7 OFDM symbols in a normal CP, and 1 subframe includes 6 OFDM symbols in an extended CP. The structure of the radio frame is only an example, and the number of subframes included in the radio frame and the number of slots included in the subframe may be changed in various ways.

Figure 3:
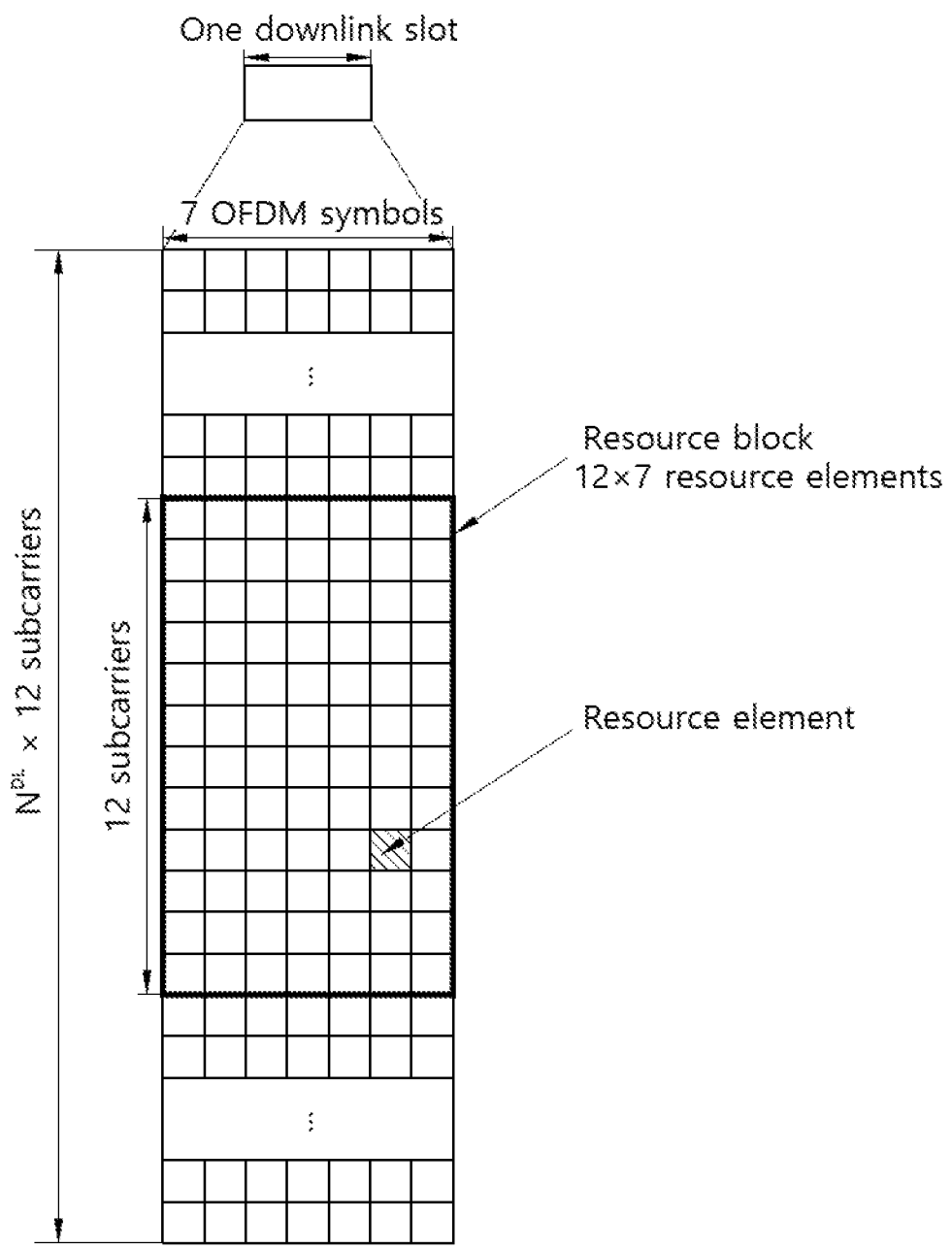
FIG. 3 illustrates one example of a resource grid for one downlink slot.

FIG. 3 shows an example of a resource grid for one downlink slot.

Referring to FIG. 3, the downlink slot includes a plurality of OFDM symbols in the time domain and includes NRB Resource Blocks (RBs) in the frequency domain. The resource block is a resource allocation unit, and it includes one slot in the time domain and includes a plurality of contiguous subcarriers in the frequency domain.

The number of resource blocks NRB included in a downlink slot depends on a downlink transmission bandwidth configured in a cell. For example, in an LTE system, the number of resource blocks NRB may be any one of 6 to 110. An uplink slot may have the same structure as the downlink slot.

Each of elements on the resource grid is called a Resource Element (RE). The resource elements on the resource grid may be identified by an index pair (k, l) within a slot. Here, k (k=0, . . . , NRBx12-1) indicates a subcarrier index in the frequency domain, and l (l=0, . . . , 6) indicates an OFDM symbol index in the time domain.

In FIG. 3, one resource block is illustrated as including 7×12 resource elements, including 7 OFDM symbols in the time domain and 12 subcarriers in the frequency domain. However, the number of OFDM symbols and the number of subcarriers within a resource block are not limited thereto. The number of OFDM symbols and the number of subcarriers may be changed in various ways depending on the length of a CP, frequency spacing, etc. For example, the number of OFDM symbols is 7 in case of a normal CP, and the number of OFDM symbols is 6 in case of an extended CP. One of 128, 256, 512, 1024, 1536, and 2048 may be selected and used as the number of subcarriers in one OFDM symbol.

Figure 4:
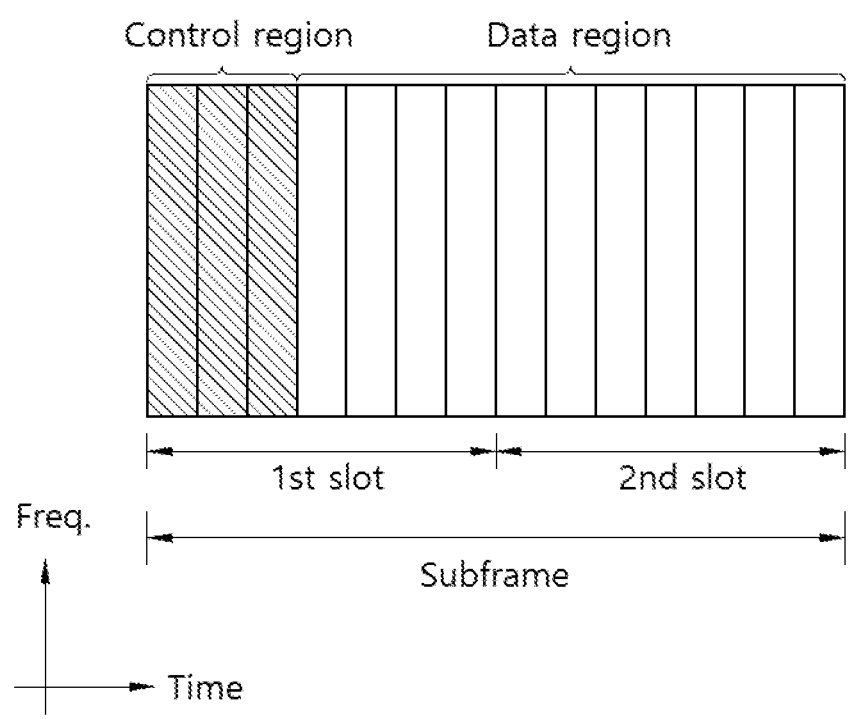
FIG. 4 illustrates an example of a downlink subframe structure in 3GPP LTE.

FIG. 4 shows an example of the structure of a downlink subframe in 3GPP LTE. The subframe includes two consecutive slots. A maximum of three former OFDM symbols of a first slot within the downlink subframe become a control region to which a physical downlink control channel (PDCCH) is allocated, and the remaining OFDM symbols become a data region to which physical downlink shared channels (PDSCHs) are allocated. Control channels, such as a physical control format indicator channel (PCFICH) and a physical hybrid ARQ indicator channel (PHICH), in addition to the PDCCH can be allocated to the control region. UE can read data information transmitted through the PDSCHs by decoding control information transmitted through the PDCCH. Here, the control region is illustrated as including the 3 OFDM symbols, but this is only illustrative. The PDCCH carries a downlink grant that informs the allocation of the resources of downlink transmission on the PDSCH. More particularly, the PDCCH can carry the allocation of the resources of the transport format of a downlink shared channel (DL-SCH), paging information on a paging channel (PCH), system information on a DL-SCH, the allocation of the resources of a higher layer control message, such as a random access response transmitted on a PDSCH, a transmission power control command, and the activation of a voice over IP (VoIP). Furthermore, the PDCCH carries an uplink grant that informs UE of the allocation of resources of uplink transmission. The number of OFDM symbols included in the control region within the subframe can be known by a PCFICH. The PHICH carries Hybrid Automatic Repeat reQuest (HARD) acknowledgment (ACK)/negative-acknowledgement (NACK) signals in response to uplink transmission.

Figure 5:
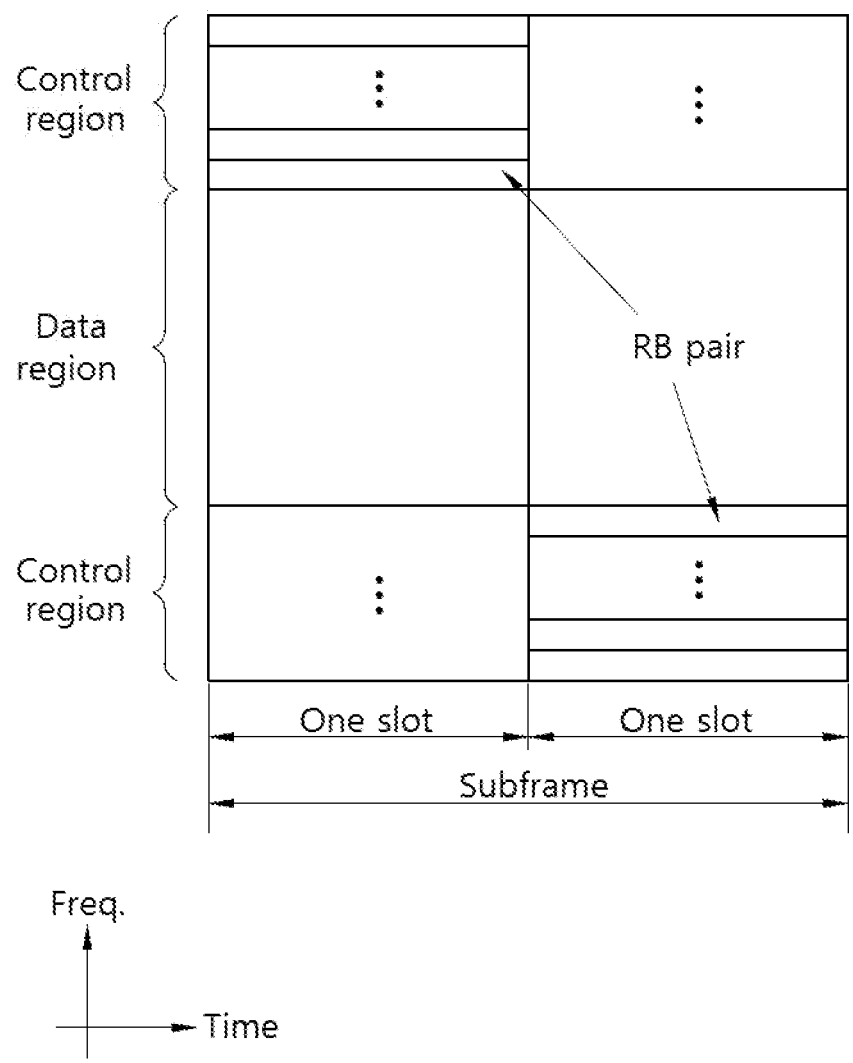
FIG. 5 illustrates a structure of an uplink subframe.

FIG. 5 shows the structure of an uplink subframe.

Referring to FIG. 5, the uplink subframe can be divided into a control region and a data region in the frequency domain. A physical uplink control channel (PUCCH) on which uplink control information is transmitted is allocated to the control region. A physical uplink shared channel (PUSCH) on which data (control information may also be transmitted according to circumstances) is transmitted is allocated to the data region. UE may transmit a PUCCH and a PUSCH at the same time or may transmit only one of a PUCCH and a PUSCH depending on a configuration.

A PUCCH for an MS is allocated in the form of a resource block pair (RB pair) in the subframe. Resource blocks that belong to the resource block pair occupy different subcarriers in a first slot and a second slot. A frequency that is occupied by the resource blocks belonging to the resource block pair to which a PUCCH is allocated is changed on the basis of a slot boundary. This is said that the RB pair allocated to the PUCCH has been subjected to frequency-hopped at the slot boundary. UE can obtain a frequency diversity gain by transmitting uplink control information through different subcarriers according to the time.

A Hybrid Automatic Repeat reQuest (HARQ) acknowledgement (ACK)/non-acknowledgement (NACK), and Channel Status Information (CSI) (e.g., a Channel Quality Indicator (CQI), a Precoding Matrix Index (PMI), a Precoding Type Indicator (PTI), and a Rank Indication (RI)) indicating a downlink channel state can be transmitted on the PUCCH.

The PUSCH is mapped to an UL-Uplink Shared Channel (SCH), that is, a transport channel. Uplink data transmitted on the PUSCH may be a transport block, that is, a data block for the UL-SCH transmitted during a TTI. The transport block may include user data. Or, the uplink data may be multiplexed data. The multiplexed data may be the multiplexing of the transport block for the UL-SCH and channel status information. For example, the channel status information multiplexed into the data may be a CQI, a PMI, or an RI. Or, the uplink data may include only the channel status information.

Figure 6:
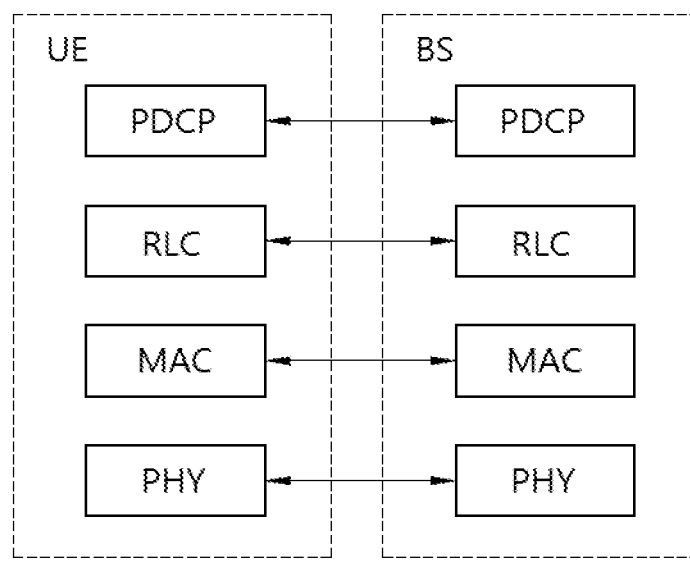
FIG. 6 is a block diagram illustrating a radio protocol architecture for a user plane.
Figure 7:
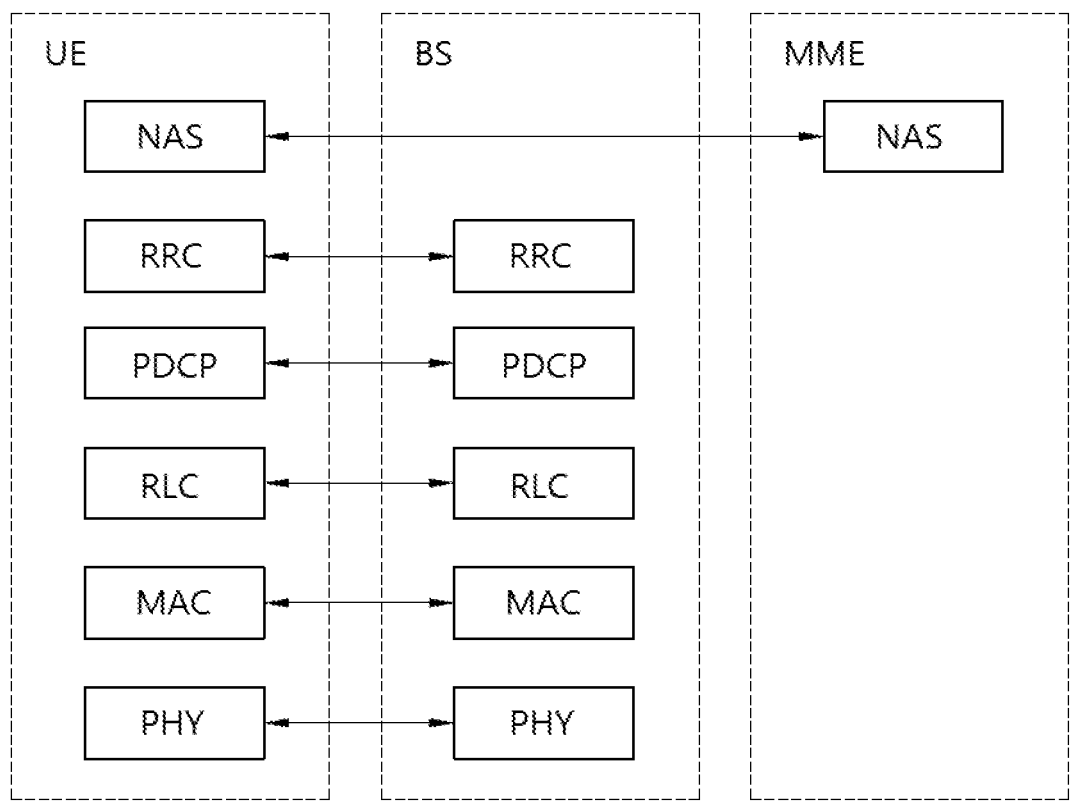
FIG. 7 is a block diagram illustrating a radio protocol architecture for a control plane.

FIG. 6 is a diagram showing a wireless protocol architecture for a user plane. FIG. 7 is a diagram showing a wireless protocol architecture for a control plane. The user plane is a protocol stack for user data transmission. The control plane is a protocol stack for control signal transmission.

Referring to FIGS. 6 and 7, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a process of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time for subframe transmission.

The RRC state means whether or not the RRC layer of UE is logically connected to the RRC layer of the E-UTRAN. A case where the RRC layer of UE is logically connected to the RRC layer of the E-UTRAN is referred to as an RRC connected state. A case where the RRC layer of UE is not logically connected to the RRC layer of the E-UTRAN is referred to as an RRC idle state. The E-UTRAN may check the existence of corresponding UE in the RRC connected state in each cell because the UE has RRC connection, so the UE may be effectively controlled. In contrast, the E-UTRAN is unable to check UE in the RRC idle state, and a Core Network (CN) manages UE in the RRC idle state in each tracking area, that is, the unit of an area greater than a cell. That is, the existence or non-existence of UE in the RRC idle state is checked only for each large area. Accordingly, the UE needs to shift to the RRC connected state in order to be provided with common mobile communication service, such as voice or data.

When a user first powers UE, the UE first searches for a proper cell and remains in the RRC idle state in the corresponding cell. The UE in the RRC idle state establishes RRC connection with an E-UTRAN through an RRC connection procedure when it is necessary to set up the RRC connection, and shifts to the RRC connected state. A case where UE in the RRC idle state needs to set up RRC connection includes several cases. For example, the cases may include a need to send uplink data for a reason, such as a call attempt by a user, and to send a response message as a response to a paging message received from an E-UTRAN.

A Non-Access Stratum (NAS) layer placed over the RRC layer performs functions, such as session management and mobility management.

In the NAS layer, in order to manage the mobility of UE, two types of states: EPS Mobility Management-REGISTERED (EMM-REGISTERED) and EMM-DEREGISTERED are defined. The two states are applied to UE and the MME. UE is initially in the EMM-DEREGISTERED state. In order to access a network, the UE performs a process of registering it with the corresponding network through an initial attach procedure. If the attach procedure is successfully performed, the UE and the MME become the EMM-REGISTERED state.

In order to manage signaling connection between UE and the EPC, two types of states: an EPS Connection Management (ECM)-IDLE state and an ECM-CONNECTED state are defined. The two states are applied to UE and the MME. When the UE in the ECM-IDLE state establishes RRC connection with the E-UTRAN, the UE becomes the ECM-CONNECTED state. The MME in the ECM-IDLE state becomes the ECM-CONNECTED state when it establishes S1 connection with the E-UTRAN. When the UE is in the ECM-IDLE state, the E-UTRAN does not have information about the context of the UE. Accordingly, the UE in the ECM-IDLE state performs procedures related to UE-based mobility, such as cell selection or cell reselection, without a need to receive a command from a network. In contrast, when the UE is in the ECM-CONNECTED state, the mobility of the UE is managed in response to a command from a network. If the location of the UE in the ECM-IDLE state is different from a location known to the network, the UE informs the network of its corresponding location through a tracking area update procedure.

The D2D operation will now be described.

In 3GPP LTE-A, the service related to D2D operation is called proximity based service (ProSe). Hereinafter, ProSe is equivalent to D2D operation and ProSe may be interchanged with D2D operation. ProSe will now be described.

The ProSe includes ProSe direction communication and ProSe direct discovery. The ProSe direct communication is communication performed between two or more proximate UEs. The UEs may perform communication by using a protocol of a user plane. A ProSe-enabled UE implies a UE supporting a procedure related to a requirement of the ProSe. Unless otherwise specified, the ProSe-enabled UE includes both of a public safety UE and a non-public safety UE. The public safety UE is a UE supporting both of a function specified for a public safety and a ProSe procedure, and the non-public safety UE is a UE supporting the ProSe procedure and not supporting the function specified for the public safety.

ProSe direct discovery is a process for discovering another ProSe-enabled UE adjacent to ProSe-enabled UE. In this case, only the capabilities of the two types of ProSe-enabled UE are used. EPC-level ProSe discovery means a process for determining, by an EPC, whether the two types of ProSe-enabled UE are in proximity and notifying the two types of ProSe-enabled UE of the proximity.

Hereinafter, for convenience, the ProSe direct communication may be referred to as D2D communication, and the ProSe direct discovery may be referred to as D2D discovery.

Figure 8:
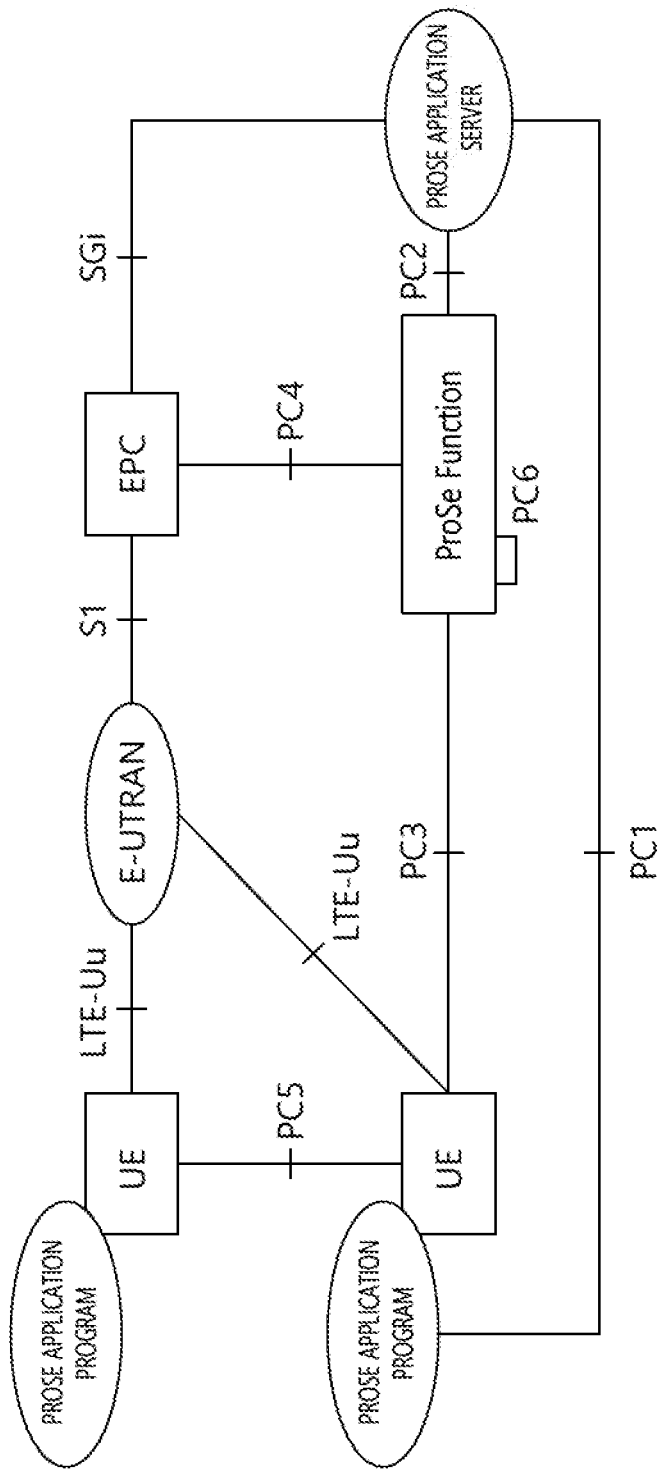
FIG. 8 illustrates a reference structure for ProSe.

FIG. 8 shows a basic structure for ProSe.

Referring to FIG. 8, the basic structure for ProSe includes an E-UTRAN, an EPC, a plurality of types of UE including a ProSe application program, a ProSe application server (a ProSe APP server), and a ProSe function.

The EPC represents an E-UTRAN core network configuration. The EPC may include an MME, an S-GW, a P-GW, a policy and charging rules function (PCRF), a home subscriber server (HSS) and so on.

The ProSe APP server is a user of a ProSe capability for producing an application function. The ProSe APP server may communicate with an application program within UE. The application program within UE may use a ProSe capability for producing an application function.

The ProSe function may include at least one of the followings, but is not necessarily limited thereto.

- Interworking via a reference point toward the 3rd party applications
- Authorization and configuration of UE for discovery and direct communication
- Enable the functionality of EPC level ProSe discovery
- ProSe related new subscriber data and handling of data storage, and also handling of the ProSe identities
- Security related functionality
- Provide control towards the EPC for policy related functionality
- Provide functionality for charging (via or outside of the EPC, e.g., offline charging)

A reference point and a reference interface in the basic structure for ProSe are described below.

- PC1: a reference point between the ProSe application program within the UE and the ProSe application program within the ProSe APP server. This is used to define signaling requirements in an application dimension.
- PC2: a reference point between the ProSe APP server and the ProSe function. This is used to define an interaction between the ProSe APP server and the ProSe function. The update of application data in the ProSe database of the ProSe function may be an example of the interaction.
- PC3: a reference point between the UE and the ProSe function. This is used to define an interaction between the UE and the ProSe function. A configuration for ProSe discovery and communication may be an example of the interaction.
- PC4: a reference point between the EPC and the ProSe function. This is used to define an interaction between the EPC and the ProSe function. The interaction may illustrate the time when a path for 1:1 communication between types of UE is set up or the time when ProSe service for real-time session management or mobility management is authenticated.
- PC5: a reference point used for using control/user plane for discovery and communication, relay, and 1:1 communication between types of UE.
- PC6: a reference point for using a function, such as ProSe discovery, between users belonging to different PLMNs.
- SGi: this may be used to exchange application data and types of application dimension control information.

The D2D operation may be supported both when UE is serviced within the coverage of a network (cell) or when it is out of coverage of the network.

Figure 9:
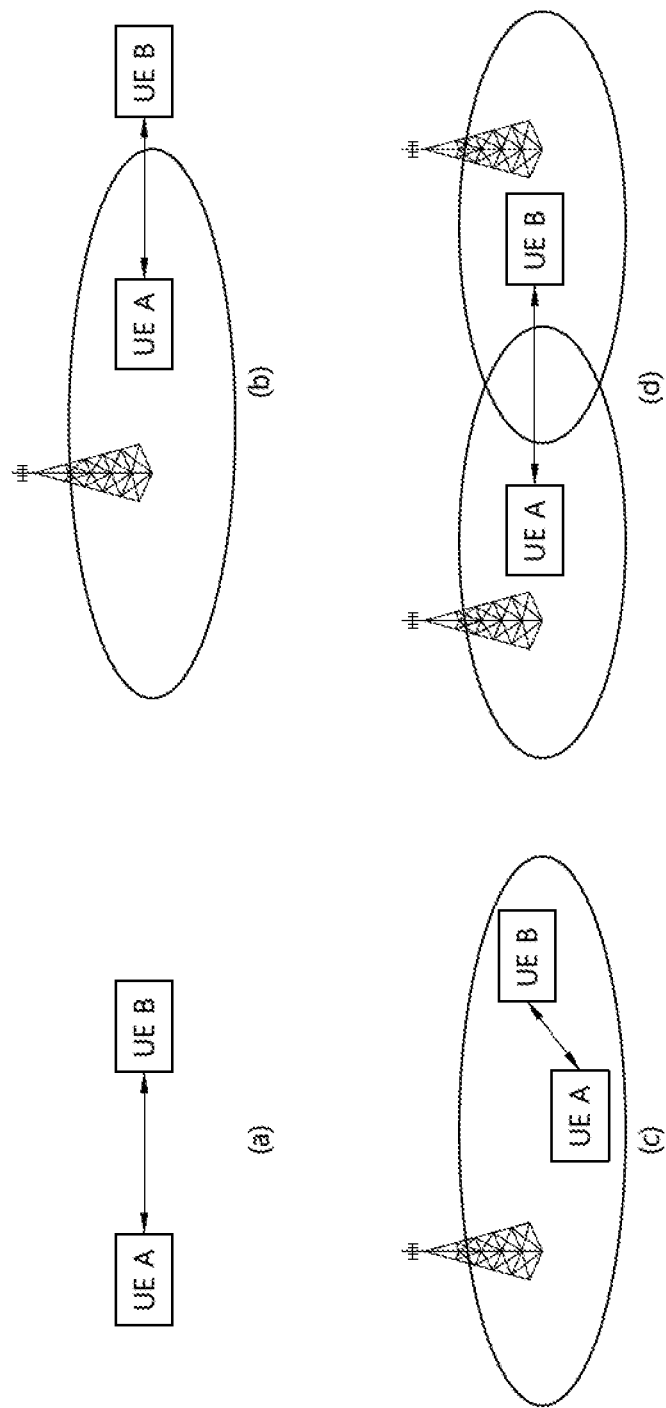
FIG. 9 illustrates layout examples of UEs performing a D2D operation and cell coverage.

FIG. 9 illustrates layout examples of UEs performing a D2D operation and cell coverage.

A scenario of D2D communication may be generally divided into (1) Out-of-Coverage Network, (2) Partial-Coverage Network, and (3) In-Coverage Network according to whether UE 1 and UE 2 are positioned in coverage/out of coverage.

An in-coverage network may be divided into an in-coverage-single-cell and an in-coverage-multi-cell according tot eh number of cells corresponding the coverage of the eNB.

A subfigure (a) of FIG. 9 illustrates one example of an out-of-coverage network scenario of D2D communication. The out-of-coverage network scenario represents performing the D2D communication between the D2D UEs without the control of the eNB. In the subfigure (a) of FIG. 9, it may be confirmed that UE 1 and UE 2 exist and UE 1 and UE 2 perform direct communication.

A subfigure (b) of FIG. 9 illustrates one example of a partial-coverage network scenario of D2D communication. The partial-coverage network scenario represents performing the D2D communication between a D2D UE positioned in the network coverage and a D2D UE positioned out of the network coverage. In the subfigure (b) of FIG. 9, it may be confirmed that UE 1 positioned in the network coverage and UE 2 positioned out of the network coverage communicate with each other.

A subfigure (c) of FIG. 9 illustrates one example of an in-coverage-single-cell scenario and a subfigure (d) of FIG. 9 illustrates one example of an in-coverage-multi-cell scenario. The in-coverage network scenario represents that the D2D UEs perform the D2D communication through the control of the eNB in the network coverage. In the subfigure (c) of FIGS. 9, UE 1 and UE 2 are positioned in the same network coverage (or cell) and perform the D2D communication under the control of the eNB. In the subfigure (d) of FIGS. 9, UE 1 and UE 2 are positioned in the network coverage, but positioned in different network coverage. In addition, UE 1 and UE 2 perform the D2D communication under the control of the eNB managing each network coverage.

Hereinafter, the D2D communication will be described in more detail.

The D2D communication may operate in the scenario illustrated in FIG. 9, but generally operate in the network coverage (in-coverage) and out of the network coverage (out-of-coverage). A link used for the D2D communication (direct communication between the UEs) may be referred to as a D2D link, a directlink, or a sidelink, but will be collectively called and described below for convenience of description.

Sidelink transmission may operate in an uplink spectrum in the case of the FDD and operate in an uplink (or downlink) subframe in the case of the TDD. Time Division Multiplexing (TDM) may be used for multiplexing the sidelink transmission and uplink transmission.

The sidelink transmission and the uplink transmission may occur simultaneously. In the uplink subframe used for the uplink transmission or the sidelink frame partially or entirely overlapped with UpPTS, the sidelink transmission may not occur. Further, sidelink transmission and reception may not also occur simultaneously.

The structure of a physical resource used for the sidelink transmission may be used equally to the structure of an uplink physical resource. However, a last symbol of the sidelink subframe is configured by a guard period and not used for the sidelink transmission. The sidelink subframe may be configured by an extended CP and a normal CP.

The D2D communication may be generally classified as a discovery (discovery), direct communication, and synchronization.

<D2D Discovery>

The D2D discovery may be applied in the network coverage (including inter-cell or intra-cell). In the inter-cell discovery, both synchronous and asynchronous cell arrangements may be considered. The D2D discovery may be utilized for various commercial purposes including advertisement, coupon issuing, friend finding, etc., for a UE in a proximal region.

When UE 1 plays a role of transmitting a discovery message, UE 1 transmits the discovery message and UE 2 receives the discovery message. Transmission and reception roles of UE 1 and UE 2 may b exchanged. Transmission from UE 1 may be received by one or more UE(s) such as UE 2.

The discovery message may include a single MAC PDU and here, the single MAC PDU may include a UE identifier (ID) and an application identifier (ID).

As a channel for transmitting the discover message, a physical sidelink discovery channel (PSDCH) may be defined. As the structure of the PSDCH, a PUSCH structure may be reused.

As a resource allocating method for the D2D discovery, two types (Type 1 and Type 2) may be used.

In the case of Type 1, the eNB may allocate a resource for transmitting the discovery message in a non-UE specific scheme.

Specifically, a radio resource pool for discovery transmission and reception constituted by a plurality of subframe sets and a plurality of resource block sets is allocated within a specific period (hereinafter, referred to as a 'discovery period') and a discovery transmission UE arbitrarily selects a specific resource in the radio resource pool and then transmits the discovery message.

The periodic discovery resource pool may be allocated for transmitting the discovery signal in a semi-static scheme. Configuration information of the discovery resource pool for discovery transmission includes a discovery period, information on a subframe set and a resource block set which may be used for transmitting the discovery signal within the discovery period, etc. The configuration information of the discovery resource pool may be transmitted to the UE by the higher layer signaling. In the case of the in-coverage UE, the discovery resource pool for discovery transmission may be configured by the ENB and notified to the UE by using RRC signaling (e.g., system information block (SIB)).

The discover resource pool allocated for the discovery within one discovery period may be multiplexed to the time-frequency resource block having the same size by TDM and/or FDM and the time-frequency resource block having the same size may be referred to as a 'discovery resource'. The discovery resource may be divided in units of one subframe and may include two physical resource blocks (PRBs) per slot in each subframe. One discovery resource may be used for transmitting discovery MAC PDU by one UE.

Further, the UE may repeatedly transmit the discovery signal within the discovery period for transmitting one transport block. Transmission of the MAC PDU transmitted by one UE may be repeated (e.g., repeated four times) contiguously or non-contiguously in the discovery period (i.e., a radio resource pool). The number of transmission times of the discovery signal for one transport block may be transmitted to the UE by the higher layer signaling.

The UE may arbitrarily select a first discovery resource in a discovery resource set which may be used for repeated transmission of the MAC PDU and other discovery resources may be determined in association with the first discovery resource. For example, a predetermined pattern may be preconfigured and a subsequent discovery resource may be determined according to the preconfigured pattern according to the location of the discovery resource first selected by the UE. Further, the UE may arbitrarily select each discovery resource in the discovery resource set which may be used for repeated transmission of the MAC PDU.

In Type 2, the resource for transmitting the discovery message may be allocated to be UE-specific. Type 2 is subdivided into Type-2A and Type-2B again. Type 2A is a scheme in which the eNB allocates the resource every transmission instance of the discovery message by the UE within the discovery period and Type 2B is a scheme of allocating the resource in a semi-persistent scheme.

In the case of Type 2B, an RRC CONNECTED UE requests allocation of a resource for transmitting a D2D discovery message to the eNB through the RRC signaling. In addition, the eNB may allocate the resource through the RRC signaling. When the UE is transited to an RRC IDLE state or when the eNB withdraws resource allocation through the RRC signaling, the UE releases a most recently allocated transmission resource. As such, in the case of Type 2B, the radio resource may be allocated by the RRC signaling and activation/deactivation of the radio resource allocated by the PDCCH may be determined.

The radio resource pool for receiving the discovery message may be configured by the eNB and notified to the UE by using the RRC signaling (e.g., system information block (SIB)).

A discovery message receiving UE monitors both discovery resource pools of Type 1 and Type 2 in order to receive the discovery message.

<D2D Direct Communication>

An application region of the D2D direct communication also includes a network coverage edge region in addition to network in-coverage and out-of-coverage. The D2D direct communication may be used for a purpose such as public safety (PS), etc.

When UE 1 plays a role of transmission of direct communication data, UE 1 transmits the direct communication data and UE 2 receives the direct communication data. Transmission and reception roles of UE 1 and UE 2 may b exchanged. Direct communication transmission from UE 1 may be received by one or more UE(s) such as UE 2.

The D2D discovery and the D2D communication may be independently defined without being associated with each other. That is, the D2D discovery is not required in groupcast and broadcast direct communication. As such, when the D2D discovery and the D2D direct communication are independently defined, the UE need not recognize an adjacent UE. In other words, in the case of the groupcast and broadcast direct communication, all receiving UEs in the group are not required to be close to each other.

As a channel for transmitting the D2D direct communication data, a physical sidelink discovery channel (PSSCH) may be defined. Further, as a channel for transmitting control information (e.g., scheduling assignment (SA) for transmitting direct communication data, a transmission format, etc.) for the D2D direct communication, a physical sidelink control channel (PSCCH) may be defined. As the PSSCH and the PSCCH, a PUSCH structure may be reused.

As a resource allocating method for the D2D direct communication, two modes (mode 1 and mode 2) may be used.

Mode 1 represents a scheme in which the eNB schedules a resource used for transmitting data or control information for the D2D direct communication to the UE. In the in-coverage, mode 1 is applied.

The eNB configures a resource pool required for the D2D direct communication. Here, the resource pool required for the D2D communication may be classified into a control information pool and a D2D data pool. When the eNB schedules control information and D2D data transmission resources in a pool configured for a transmitting D2D UE by using the PDCCH or ePDCCH, the transmitting D2D UE transmits the control information and the D2D data by using the allocated resource.

The transmitting UE requests a transmission resource to the eNB and the eNB schedules the resources for transmitting the control information and the D2D direct communication data. That is, in the case of mode 1, the transmitting UE should be in the RRC CONNECTED in order to perform the D2D direct communication. A buffer status report (BSR) procedure is performed so that the transmitting UE transmits the scheduling request to the eNB and then the eNB determines a quantity of resources requested by the transmitting UE.

When receiving UEs monitor the control information pool and decode control information associated therewith, the receiving UEs may selectively decode transmission of D2D data associated with the control information. The receiving UE may not decode the D2D data pool according to a control information decoding result.

Mode 2 represents a scheme in which the UE arbitrarily selects a specific resource in the resource pool in order to transmit data or control information for the D2D direct communication. In the out-of-coverage and/or edge-of-coverage, mode 1 is applied.

In mode 2, a resource pool for transmitting the control information and/or a resource pool for transmitting the D2D direct communication data may be pre-configured or semi-statically configured. The UE receives the configured resource pool (time and frequency) and selects the resource for the D2D communication transmission in the resource pool. That is, the UE may select the resource for transmitting the control information in the control information resource pool in order to transmit the control information. Further, the UE may select the resource in the data resource pool for transmission of the D2D direct communication data.

In D2D broadcast communication, the control information is transmitted by a broadcasting UE. The control information explicitly and/or implicitly a location of a resource for data reception in association with a physical channel (i.e., PSSCH) for transporting the D2D direct communication data.

<D2D Synchronization>

A D2D Synchronization Signal/sequence (D2DSS) may be used for the UE to acquire time-frequency synchronization. In particular, in the case of the out-of-network coverage, since it is impossible to control the eNB, a new signal and a new procedure may be defined for establishment of synchronization between the UEs. The D2D synchronization signal may be referred to as a Sidelink Synchronization signal.

A UE that periodically transmits the D2D synchronization signal may be referred to as a D2D Synchronization Source or a Sidelink Synchronization Source. When the D2D synchronization source is the eNB, the structure of the transmitted D2D synchronization signal may be the same as the PSS/SSS. When the D2D synchronization source is not the eNB (e.g., UE or Global Navigation Satellite System (GNSS), the structure of the transmitted D2D synchronization signal may be newly defined.

The D2D synchronization signal may be periodically transmitted with a period smaller than 40 ms. Each UE may have multiple physical-layer D2D synchronization identities. The physical-layer D2D synchronization identity may be referred to as a physical-layer sidelink synchronization identity or simply referred to as a D2D synchronization identity.

The D2D synchronization signal includes a D2D primary synchronization signal/sequence and a D2D secondary synchronization signal/sequence. The D2D primary synchronization signal/sequence and the D2D secondary synchronization signal/sequence may be referred to as a primary sidelink synchronization signal (PSSS) and a secondary sidelink synchronization signal (SSSS).

Before transmitting the D2D synchronization signal, the UE may first search the D2D synchronization source. In addition, when the D2D synchronization source is searched, the UE may acquire the time-frequency synchronization through the D2D synchronization signal received from the searched D2D synchronization source. In addition, the corresponding UE may transmit the D2D synchronization signal.

Further, a channel may be required for a purpose of transferring system information used for communication between the UEs together with the synchronization and synchronization related information and the channel for such a purpose may be defined. Such a channel may be referred to as a Physical D2D Synchronization Channel (PD2DSCH) or a Physical Sidelink Broadcast Channel (PSBCH).

Figure 10:
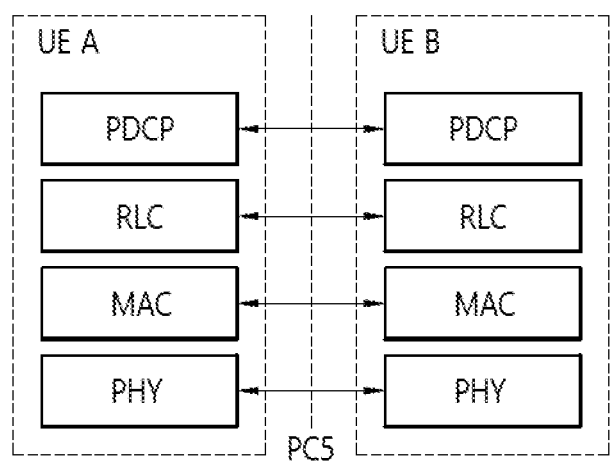
FIG. 10 illustrates a user plane protocol stack for ProSe direct communication.

FIG. 10 illustrates a user plane protocol stack for ProSe direct communication.

Referring to FIG. 10, a PC5 interface may be constituted by PDCH, RLC, MAC, and PHY layers.

In the ProSe direct communication, there may be no HARQ feedback. An MAC heard may include a source layer-2 ID and a target layer-2 ID.

Figure 11:
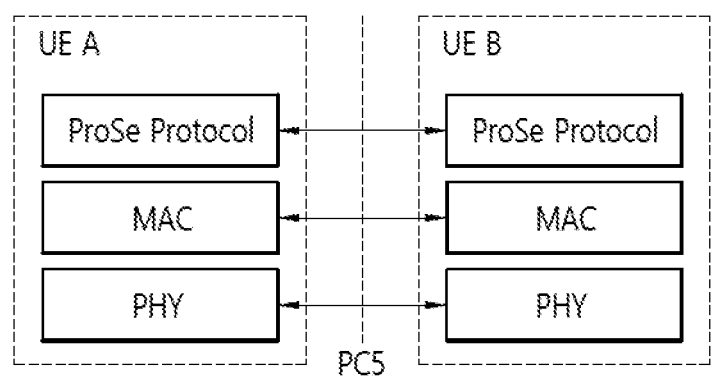
FIG. 11 illustrates a PC5 interface for D2D discovery.

FIG. 11 illustrates a PC 5 interface for D2D discovery.

Referring to FIG. 11, the PC 5 interface is constituted by the MAC layer, the PHY layer, and a ProSe protocol which is the higher layer. In the higher layer (ProSe Protocol), authorization for announcement (hereinafter, referred to as announcement) and monitoring of discovery information is handled and contents of the discovery information are transparent with respect to access stratum (AS). The ProSe Protocol allows only valid discovery information to the AS for the announcement.

The MAC layer receives the discovery information from the higher layer (ProSe Protocol). An IP layer is not used for transmitting the discovery information. The MAC layer determines the resource used for announcing the discovery information received from the higher layer. The MAC layer generates an MAC protocol data unit (PDU) for transporting the discovery information and sends the generated MAC PDU to the physical layer. The MAC header is not added.

<Feedback Transferring Method>

Hereinafter, there will be proposed a method and a device for transferring feedback information including measurement result: Reference signal received power (RSRP), reference signal received quality (RSRQ), and/or channel status information (CSI). The feedback information is preferably control information related to downlink received from the eNB.

One following example is preferably applied between two or more UEs which communicate through the sidelink and a remote UE may be more advantageously utilized in a unidirectional relay situation supporting only a transmission function of the sidelink.

One following example may be applied in a wireless network including two or more UEs and the eNB and for example, a UE more spaced apart from the eNB may be referred to as a remote UE and a UE closer to the eNB may be referred to as a relay UE, but the role of the UE is not particularly determined only by the distance from the eNB. The remote UE may generate the feedback information and transmit the feedback information through the sidelink and the relay UE may transmit the feedback information through the uplink. In one following example, there will be proposed a technique of transmitting the feedback by using the sidelink and the remote/relay UE instead of using the relay node in the related art.

Figure 12:
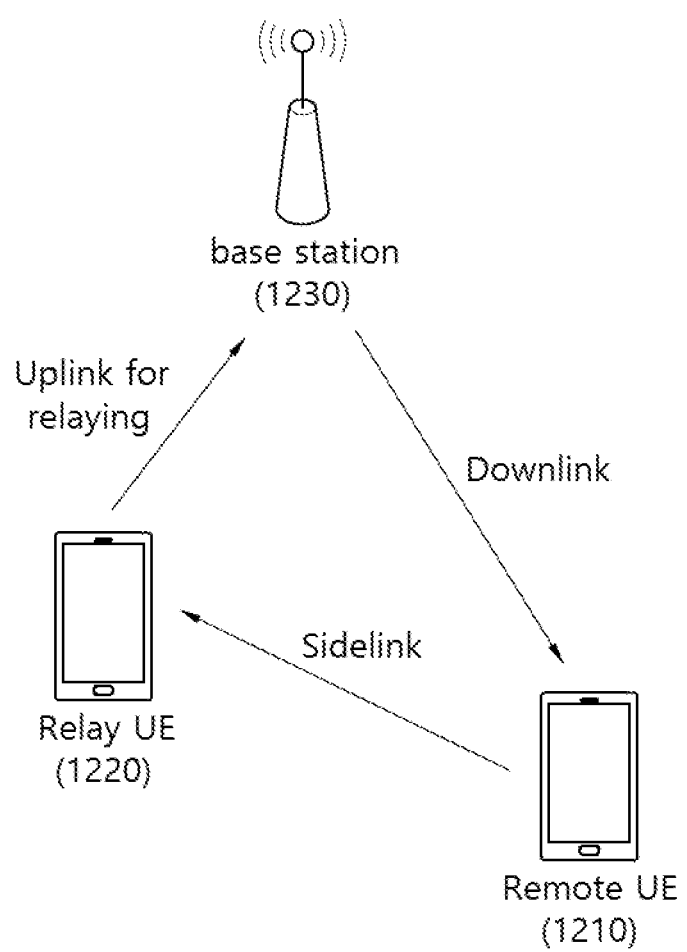
FIG. 12 is a diagram illustrating a unidirectional relay situation to which one example of the present disclosure is applied.

FIG. 12 is a diagram illustrating a unidirectional relay situation to which one example of the present disclosure is applied.

This specification proposes a method for effectively transferring the feedback information in an operation of the UE (e.g., relay UE) which relays data of another UE (e.g., remote UE) to the eNB. One following example may be more effective in the unidirectional relay situation illustrated in FIG. 12. A unidirectional relay includes a situation in which data generated by a remote UE 1210 goes through a relay process, but data generated by the network and reaching an eNB 1230 is transferred directly to the remote UE 1210 without the relay process, in a situation in which the remote UE 1210 which is far away from the eNB transfers the data of the remote UE 1210 to the eNB 1230 through the relay operation provided by the relay UE 1220 which is relatively close to the eNB.

That is, the remote UE 1210 transmits data to be transmitted to the relay UE 1220 through the sidelink and the relay UE 1220 transmits the corresponding data to the eNB 1230 through the uplink again. The eNB 1230 transmits the data to be transmitted to the remote UE 1210 immediately without the relay operation through the downlink. The unidirectional relay operation has an advantage in that since the remote UE 1210 transmits the data to the close relay UE 1220 with low power, battery consumption may be reduced and the downlink is continuously received to reduce a time delay of downlink data.

Further, as described above, since the sidelink is configured by the same or similar waveform in the same frequency domain as the uplink, it may be simple that a UE having an uplink transmission function additionally has a sidelink transmission function. However, in addition to a downlink receiving function, there may be significant implement cost in separately providing a sidelink receiving function. In this case, when the unidirectional relay is performed, the remote UE 1210 need not have a receiving function for the sidelink, implementation cost may be reduced. That is, the UE that operates according to the unidirectional relay does not support the receiving function for the sidelink. That is, the UE that operates according to the unidirectional relay does not support the receiving function for the sidelink. A specific UE may be designed to support only the unidirectional relay, but a UE that supports a bidirectional relay may operate according to the unidirectional relay only under a specific condition. That is, the UE may operate by the unidirectional relay only when receiving the signal from the eNB or performing communication through a specific resource or other specific conditions are satisfied.

The operation of FIG. 12 may be more advantageous in an Internet of Things (IoT) environment. For example, when the remote UE 1210 is an instrument which operates at low power, the instrument may operate at the low power and may be positioned far away from the eNB 1230. In this case, the eNB 1230 repeatedly transmits downlink data to the remote UE 1210 to secure reliability of communication and it may be difficult for the corresponding remote UE 1210 to directly transmit feedback data corresponding to the downlink data to the eNB 1230. In such a situation, a provider locates the relay UE 1220 around the remote UE 1210 to collect the data generated by the remote UE 1210 through the sidelink and transmit the corresponding data to the eNB 1230.

Meanwhile, feedback information related to the downlink may be required for smoothly operate the downlink between the eNB 1230 and the remote UE 1210 and the sidelink between the remote UE 1210 and the relay UE 1220. The feedback information includes various data related to the downlink data received from the eNB and a detailed example thereof will be described below.

For example, the feedback information may include information on a data decoding result (i.e., a downlink data decoding result). For example, the feedback information may be information indicating whether decoding data received through a specific link (e.g., downlink) is successful and the HARQ-ACK/NACK may be a representative example. When a receiving side feeds back the information to a transmitting side, the transmitting side may perform retransmission of data of which decoding is unsuccessful.

For example, the feedback information a measurement result of a related link, i.e., information indicating the quality of the corresponding link. That is, the feedback information may include at least any one of information on Reference signal received power (RSRP), reference signal received quality (RSRQ), channel status information (CSI), pathloss, etc. When the receiving side measures the information and feeds back the measured information to the transmitting side, the transmitting side may adjust the quantity of resources or a modulation and coding scheme (MCS) used for transmission to be optimal to the link quality by using the feedback information.

As illustrated in FIG. 12, in the case of the unidirectional relay, an appropriate technique of transferring the feedback information is required. The reason is that as illustrated in FIG. 12, when one device (e.g., the eNB) transmits the signal to another device (e.g., the remote UE), opposite-direction transmission (e.g., uplink transmission) is not permitted and only relaying through a third device (e.g., the relay UE) is possible. In the case of the downlink, since the information generated by the remote UE 1210 may not directly be transferred to the eNB 1230, the feedback information may be transferred only through the relay UE 1220.

Hereinafter, an example of the feedback technique considering the unidirectional relay situation will be described.

One following example is a technique of transmitting feedback information (e.g., a data decoding result) for the downlink between the eNB 1230 and the remote UE 1210.

In the case of the HARQ, in general, a plurality of HARQ processes operates in parallel in the downlink, and as a result, it is effective to concurrently transmit different data through different HARQ processes. In this case, it may be effective that a time when the HARQ-ACK/NACK information for specific data is transmitted has a predetermined relationship with a reception time of the corresponding data. For example, HARQ-ACK/NACK for a physical downlink shared channel (PDSCH) transmitted in subframe n may be transmitted in subframe n+k and a k value may be predetermined or included in a message for scheduling the PDSCH.

When such a relationship is used, the ENB and the UE will clearly know which data transmission of HARQ-ACK/NACK information is transmitted and at which time the HARQ-ACK/NACK information is transmitted. However, it is impossible to utilize the time relationship in the unidirectional relay illustrated in FIG. 12. The reason is that the eNB 1230 and the remote UE 1210 to accurately promise a time required for passing through both the sidelink and the uplink. That is, the HARQ-ACK/NACK information generated by the remote UE 1210 is transferred to the eNB 1230 through the uplink via the relay UE 1220 through the sidelink and since the sidelink and the uplink are links to which separate timings are applied, even though specific ACK/NACK information is transferred to the eNB 1230, there may be a problem in that it is difficult for the eNB 1230 to determine which downlink data the corresponding information is ACK/NACK information corresponding to.

<First Feedback Technique>

The first feedback technique allows the HARQ-ACK/NACK signal (regardless of a data transmission time) to be generated to correspond to the HARQ process and the generated ACK/NACK signal to be relayed through the relay UE 1220. As one example, when the remote UE 1210 receives the PDSCH, the corresponding UE 1210 generates feedback information including HARQ process ID and the decoding result (i.e., ACK/NACK) of the PDSCH and transmits the generated feedback information to the relay UE 1220 by using the sidelink.

FIG. 13 illustrates one example of feedback information configured based on an HARQ process ID. As illustrated in FIG. 13, the feedback information may include information on the HARQ process ID corresponding to the received PDSCH and ACK/NACK information for the PDSCH. The number of HARQ processes may be variously configured and for example, configured to 8.

Figure 14:
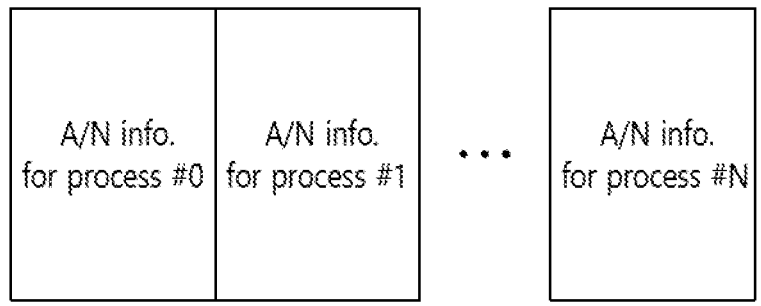
FIG. 14 illustrates another example of the feedback information configured based on the HARQ process ID.

FIG. 14 illustrates another example of the feedback information configured based on the HARQ process ID. As illustrated in FIG. 14, the HARQ process ID may not be explicitly displayed and only the ACK/NACK information may be included. In this case, first ACK/NACK information may be implicitly indicated to correspond to a first HARQ process ID.

In one example of FIGS. 13 and/14, the ACK/NACK information (i.e., ACK/NACK state) may include a decoding result of a single codeword, but may include a decoding result for each codeword when a plurality of codewords is transmitted in one process by MIMO transmission, etc. Meanwhile, when scheduling information for the PDSCH may not be received and discontinuous transmission (DTX) which does not correspond to both the ACK and the NACK becomes problematic, the ACK/NACK information may include information indicating the DTX.

In the aforementioned example, it is preferable that the ACK/NACK information shows a latest state on each HARQ process. That is, when an ACK/NACK state corresponding to a specific HARQ process ID is reported, it is preferable to report the latest state. This may be related to setting a maximum retransmission number for a specific packet in the eNB. That is, the eNB attempts retransmission at the maximum retransmission number and when the eNB does not finally receive the ACK, the eNB performs an operation of dropping the corresponding packet. When the latest ACK/NACK state is not reported in such a situation, since ACK/NACK for an already dropped packet may be reported, it is preferable to transmit feedback information including the latest state.

Meanwhile, the ACK/NACK information according to the embodiment may indicate the latest ACK/NACK state and indicate a state before a predetermined time from a generation time of the feedback information (i.e., ACK/NACK information) in order to guarantee a processing time of the UE. That is, the ACK/NACK information may indicate a state before a predetermined subframe from a time when the remote UE 1210 generates the feedback information. In one following example, as a unit indicating a 'predetermined time', the subframe is used. However, the subframe may just indicate a unit indicating a predetermined time interval and instead of the subframe, various terms including a radio frame, a frame unit, a frame index, a symbol index, and the like may be used.

Figure 15:
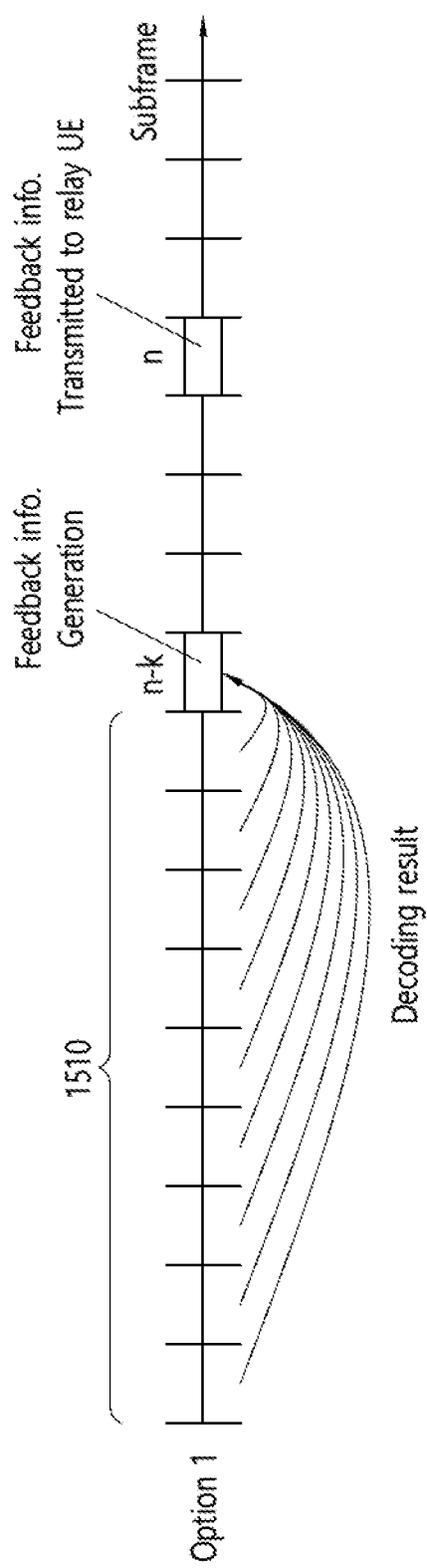
FIGS. 15 to 17 are diagrams illustrating a relationship of a generation time of feedback information and downlink data which becomes a target of the feedback information.

FIG. 15 is a diagram illustrating a relationship of a generation time of feedback information and downlink data which becomes a target of the feedback information.

According to one example of FIG. 15, the remote UE 1210 transmits the feedback information to the relay UE 1220 n by the sidelink in subframe #n. The ACK/NACK information included in the feedback information is generated in subframe #n-k. Further, the corresponding feedback information (e.g., ACK/NACK information) is information corresponding to data received through at least one downlink subframe 1510 before subframe #n-k. That is, the corresponding ACK/NACK information may indicate a decoding state (i.e., a latest ACK/NACK state) on each HARQ process based on a time before subframe #n-k. A detailed form of the ACK/NACK information may be based on FIG. 13 or 14. The aforementioned k may be a positive integer which is preconfigured.

Meanwhile, the feedback information may be transferred to the eNB 1230 from the relay UE 1220 through the uplink at a specific time (e.g., a time of subframe #n+x) after being generated in subframe #n. In this case, information (e.g., information on a subframe number or a time of transmitting the subframe) on subframe #n is preferably included in the information transferred to the eNB 1230. The ENB 1230 may determine a decoding result of the remote UE 1210 based on the information on subframe #n, a preconfigured k value, and a decoding result (i.e., latest ACK/NACK state) corresponding to a specific interval 1510.

Figure 16:
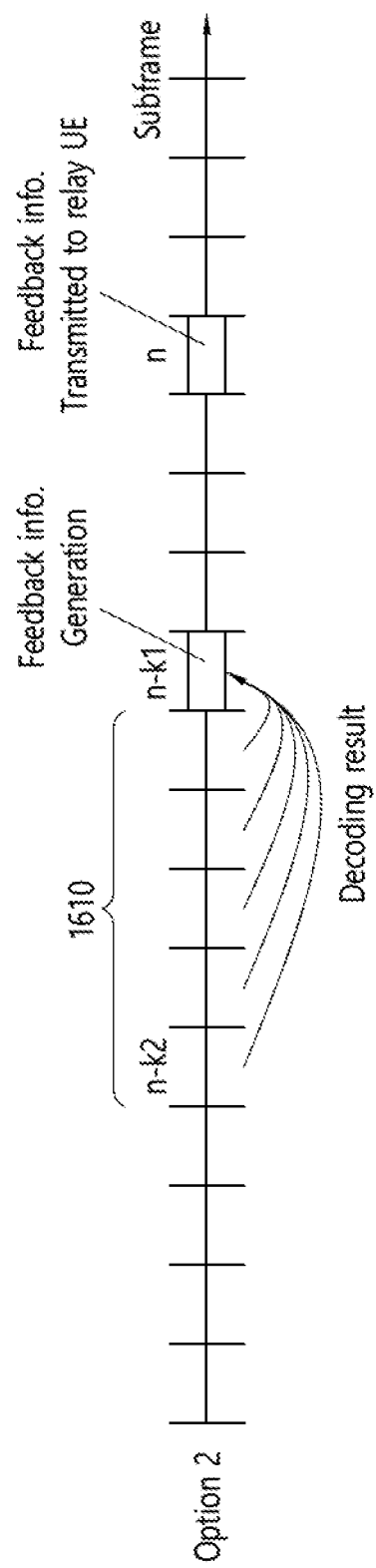
Figure 17:
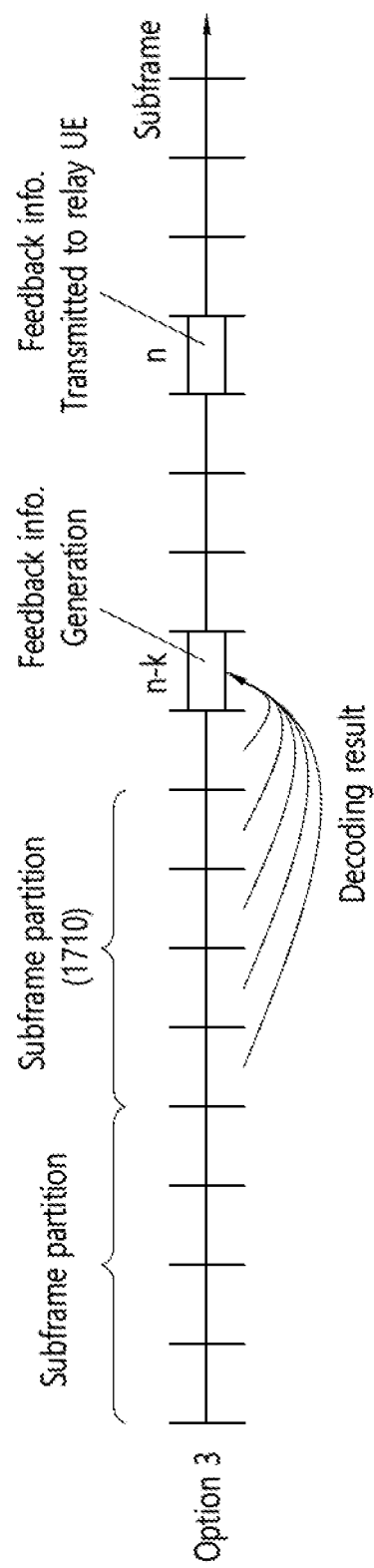

One example of FIG. 15 may be variously modified and FIGS. 16 and 17 illustrate one modified example.

In FIG. 16, the decoding result included in the ACK/NACK information is configured differently from that in one example of FIG. 15. Specifically, ACK/NACK information of FIG. 16 may indicate the latest state of each HARQ process between subframe #n-k1 and subframe #n-k2. That is, the latest ACK/NACK state information for a downlink subframe 1610 between subframe #n-k1 and subframe #n-k2 is transferred to the relay UE 1220. Other technical features may be configured similarly to one example of FIG. 15. When scheduling information for a specific HARQ process ID is not received during the downlink subframe 1610 between subframe #n-k1 and subframe #n-k2, the corresponding process may be reported by DTX.

In FIG. 17, the decoding result included in the ACK/NACK information is configured differently from that in one example of FIG. 15. Specifically, the ACK/NACK information of FIG. 17 may include the latest ACK/NACK state in a preconfigured subframe partition. Start and end points of the subframe partition may be configured regardless of the time (i.e., subframe #n) when the ACK/NACK information is transmitted to the relay UE 1220. For example, a set of all subframes may be distinguished from a set (i.e., subframe partition) constituted by N contiguous subframes. The remote UE 1210 may transmit the corresponding ACK/NACK information (i.e., feedback information) in subframe #n and in this case, the latest ACK/NACK state in each HARQ process on a last partition 1710 before subframe #n-k may be included in the feedback information. Other technical features may be configured similarly to one example of FIGS. 15 and/or 16.

One example of FIG. 15 has an advantage in that all previous situations are reflected. One example of FIG. 16 has an advantage in that a situation such as recent DTX may be reported by excluding that excessively old information is included in the feedback information. Further, in one example of FIG. 17, a time interval is divided in advance and when the feedback information is transferred to the eNB within one partition, it may be determined which time interval of information is contained. Meanwhile, in one example of FIG. 15 and/or FIG. 16, the feedback information may additionally include information (e.g., a radio frame and a subframe index) on the time when the feedback information is generated) or information on the start point and the end point of the time interval including the decoding result included in the feedback information in order to notify which time interval of information is included in the feedback information.

The aforementioned examples are more generalized and expressed as below.

The remote UE 1210 may receive the downlink data from the eNB 1230 through the downlink. In this case, the downlink data may be data included in at least one downlink subframe 1510 illustrated in FIG. 15, data included in the downlink subframe 1610 between subframe #n-k1 and subframe #n=k2 in FIG. 16, or data on the last partition 1710 before subframe #n-k in FIG. 17. In other words, the remote UE 1210 may receive the downlink data through at least one downlink subframe 1510, 1610, or 1710 before an n-k-th subframe.

Thereafter, the remote UE 1210 may transmit the feedback information related to the downlink data to the relay UE 1220 through the sidelink. The feedback information may be HARQ-ACK/NACK information or other control information including CSI information, etc. The feedback information related to the downlink data is preferably generated in an n-k-th subframe (or n-k1-th subframe) by the remote UE. Further, the feedback information related to the downlink data is preferably transmitted to the relay UE 1220 in an n-th subframe by the remote UE 1210.

<Second Feedback Technique>

The second feedback technique described below is a modification of the first feedback technique and a feature not described below may be the same as the feature of the first feedback technique.

The second feedback technique may be acquired by modifying the examples of FIGS. 13 and 14. Specifically, the ACK/NACK information illustrated in FIGS. 13 and 14 may be used as it is, but each ACK/NACK information may correspond to not the HARQ process (or HARQ process ID) but one downlink subframe. That is, the ACK/NACK information for the PDSCH in each downlink subframe may be fed back. In this case, in the example of FIG. 13, the information on the HARQ process ID may be replaced with information (e.g., a subframe index or a value acquired by computing the subframe index into a specific number by a module) and in the example of FIG. 14, a specific HARQ process may be replaced with a specific downlink subframe. When one PDSCH is repeatedly transmitted in several subframes, an index of an initially transmitted subframe or a last subframe may be used (instead of the HARQ process ID).

<Third Feedback Technique>

A third feedback technique described below is a technique for reducing the time delay of transmission of the feedback information (e.g., HARQ-ACK/NACK information), which may occur the first feedback technique and/or the second feedback technique. Specifically, it is proposed that general data to be transmitted by the remote UE 1210 is transmitted through the relay UE 1220, but the information on the HARQ-ACK/NACK is operated to be directly transmitted by the eNB 1230 through the uplink without passing through the relay UE 1220.

Figure 18:
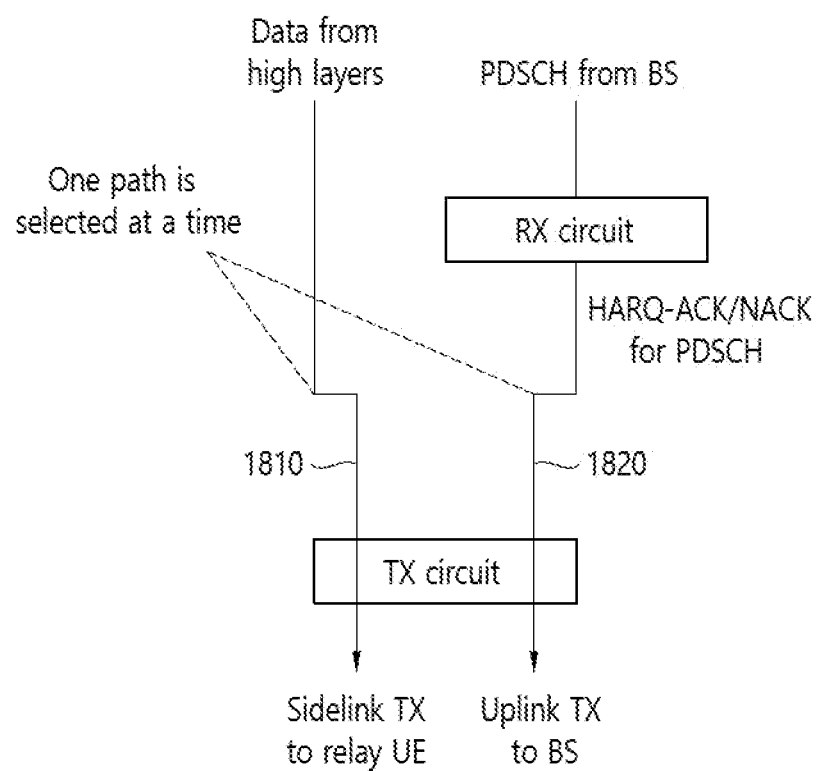
FIG. 18 is a diagram illustrating an operation in which any one of two data paths is selected according to an attribute of transmission data.

FIG. 18 is a diagram illustrating an operation in which any one of two data paths 1810 and 1820 is selected according to an attribute of transmission data. That is, the remote UE 1210 may select a path 1810 for transmitting the signal to the relay UE 1220 through the sidelink and a path 1820 for transmitting the signal to the eNB 1230 through the uplink other than the sidelink. A criterion for selecting both paths 1810 and 1820 may be an attribute of transmission data, and as a result, when the data is information on HARQ-ACK/NACK, the path 1820 toward the eNB 1230 is selected and if not, the path 1810 through the sidelink may be selected.

In order to perform the operation of FIG. 18, the remote UE 1210 preferably appropriately switch transmission through the uplink and transmission through the sidelink to each other. When both transmissions are simultaneously configured at the same time, it is possible to select only a path having a higher priority between the uplink and the sidelink. The priority for the uplink or the sidelink may be fixedly configured and may be configured variably according to a channel environment for the sidelink and/or the uplink measured by the remote UE 1210 or the signal received from the eNB 1230.

<Fourth Feedback Technique>

The fourth feedback technique described below proposes that the HARQ-ACK/NACK feedback for the PDSCH is disabled and the ACK/NACK used in ARQ in the higher layer such as radio link control (RLC) is used. That is, when the first feedback technique and/or the second feedback technique are/is used, transmission of the HARQ-ACK/NACK is excessively delayed in some cases, there may be no significant difference from the case by the higher layer ARQ operation. In this case, there may be a problem in that overhead increases in which it is unnecessary to report the HARQ-ACK/NACK. Accordingly, the ENB 1230 may instruct the remote UE 1210 not to transmit the corresponding HARQ-ACK even when receiving the PDSCH.

Since four techniques described above may show optimal effects in different situations, the eNB 1230 may configure which schemes among the aforementioned schemes a specific remote UE 1210 is to use. For example, it is possible to select any one of the aforementioned feedback techniques through the RRC signaling or the MAC signaling or it is possible to select any one feedback technique through dynamic signaling such as PDCCH. Alternatively, it is possible to designate a set of feedback techniques available through the RRC signaling or other MAC signaling and then, designate a feedback technique to be actually applied through the PDCCH, etc.

Some of the aforementioned examples may be applied even in a bidirectional relay in addition to the unidirectional relay illustrated in FIG. 12.

Figure 19:
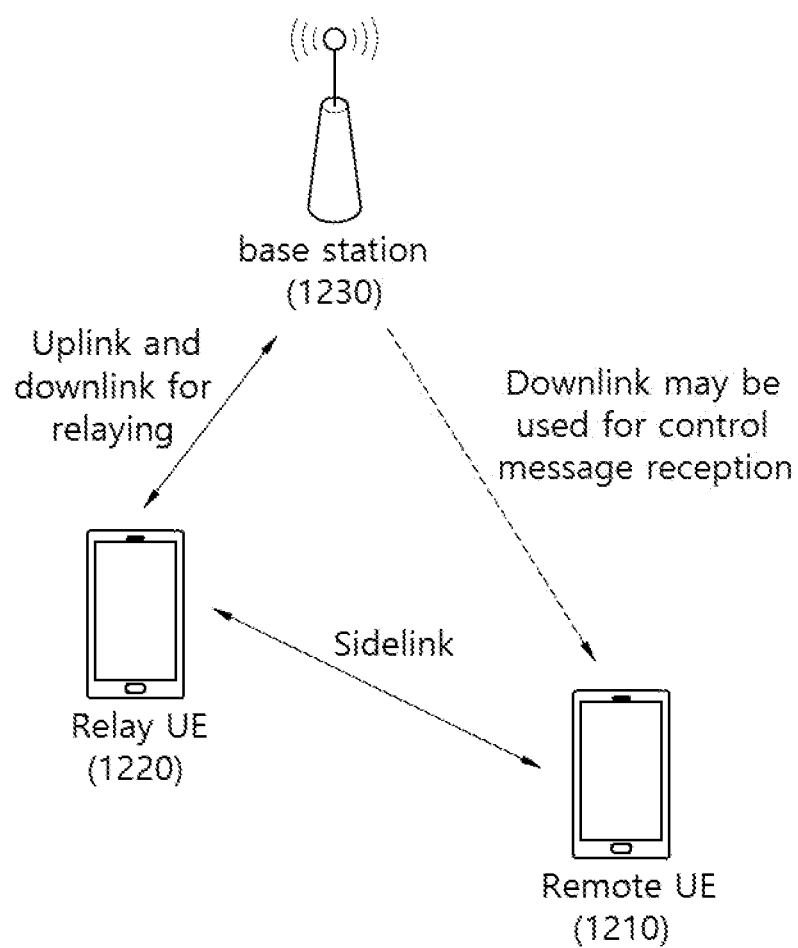
FIG. 19 is a diagram illustrating a bidirectional relay situation to which one example of the present disclosure may be applied.

FIG. 19 is a diagram illustrating a bidirectional relay situation to which one example of the present disclosure may be applied. One example of FIG. 19 is one example of in which transmission and reception between the remote UE 1210 and the relay UE 1220 are supported. In this case, the aforementioned example may be applied to transferring the HARQ-ACK/NACK information for the data in the sidelink other than the data received by the remote UE 1210 through the downlink.

Specifically, in a standard in the related art, the HARQ operation for the sidelink between the remote UE 1210 and the relay UE 12220 is not supported. As a result, in the case of the sidelink, it may be difficult to configure an accurate time relationship between data transmission and HARQ-ACK transmission. However, when the first feedback technique and/or the second feedback technique are/is applied, HARQ-ACK/NACK feedback transmission may be implemented even in a state in which the time relationship is not determined.

According to the first feedback technique and/or second feedback technique, an operation is performed in which the feedback information (i.e., HARQ-ACK/NACK) for the downlink is generated by the remote UE 1210 and the generated information is transferred to the relay UE 1220. However, in one example of FIG. 19, an operation may be performed in which the feedback information (i.e., HARQ-ACK/NACK) is generated by the relay UE 1220 and the generated information is transferred to the eNB 1230. The feedback information transferred to the ENB may be finally transferred to the remote UE 1210 through the downlink. For example, in such a process, field structures of FIG. 13 and/or FIG. 14 may be used as they are. Further, examples for the generation/transmission time of the feedback information proposed through FIGS. 15 to 17 and the target of the decoding result included in the feedback information may be applied even to the feedback information generated by the relay UE 1220.

<CSI Feedback for Downlink between eNB and Remote UE>

Since the first to fourth feedback techniques may be applied to all types of feedback information in addition to the HARQ-ACK/NACK information, the first to fourth feedback techniques may be applied even to the channel status information other than the ACK/NACK information as described above. When the feedback information includes the CSI, the first to fourth feedback techniques may be additionally modified by considering the following matters.

In the unidirectional relay, downlink CSI measured by the remote UE 1210 is transferred to the eNB 1230 through the relay UE 1220. In this case, the downlink CSI may vary depending on a time when the remote UE 1210 measures the downlink CSI and for example, the reason is that an element such as at which level the adjacent cell applies interference will be changed depending on the time. Accordingly, when the downlink CSI is fed back through the sidelink, it is preferable that the feedback information includes information on the time of measuring the CSI. As one example, it is preferable to feedback a subframe index (or other identification information to identify the subframe) of a CSI reference resource which is a resource which becomes a criterion which the remote UE 1210 uses at the time of measuring specific CSI together.

Similarly to other feedback techniques, the third feedback technique may also be used even for the feedback for the CSI. That is, the feedback information including the information on the CIS may be directly reported to the eNB 1230 through the uplink other than the sidelink. When the feedback information includes both the HARQ-ACK/NACK information and the CSI information, the HARQ-ACK/NACK information and the CSI information may be directly reported to the eNB 1230 and the remaining data (data other than the feedback information) of the remote UE 1210 may be relayed through the relay UE 1220. Meanwhile, in order to prevent the remote UE 1210 to transmit the PUSCH to the eNB 1230 for the CIS information, only the CSI using the PUCCH may also be reported to the eNB 1230 through the uplink.

Meanwhile, as described through one example of FIG. 19, when the relay UE 1220 performs measurement for the sidelink signal transmitted by the remote UE 1210, the measured signal may be fed back to the remote UE 1210 through the eNB 1230 and such an example may be applied even to the CSI information. In particular, in the case of the sidelink, since a measurement value measured for a longer time than the CSI such as the RSRP, the RSRQ, the RSSI, or the pathloss may also be influenced by the measurement time (in the case of the sidelink, an interference level is significantly changed due to whether to perform transmission between adjacent UEs), when and at which resource the measurement value is a value measured may be additionally announced even when the information is fed back.

The aforementioned specific example may be implemented through various devices. For example, the example may be implemented by hardware, firmware, software, or combinations thereof.

Figure 20:
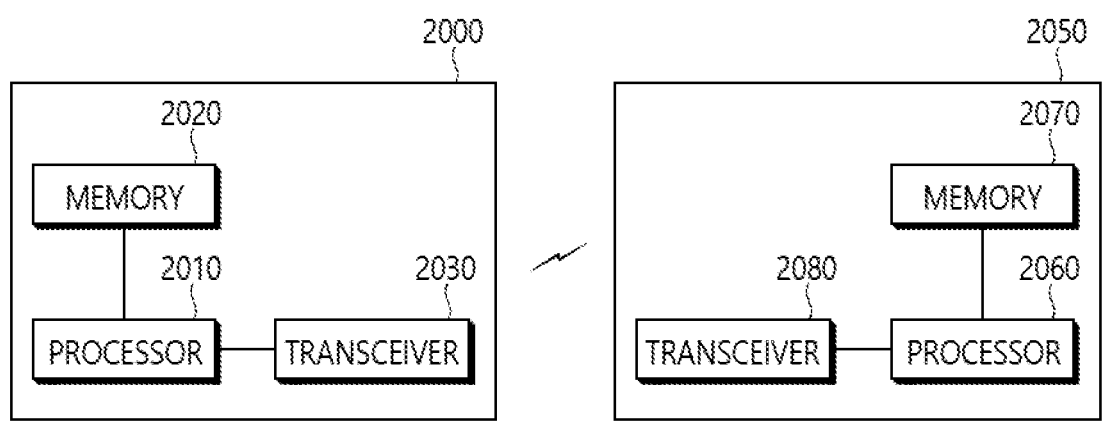
FIG. 20 illustrates one example of a device in which one example of the present disclosure is implemented.

FIG. 20 illustrates one example of a device in which one example of the present disclosure is implemented.

Referring to FIG. 20, a transmitting device 2000 and a receiving device 2050 may operate according the aforementioned example. For example, the remote UE 1210 may be expressed as the transmitting device 200 or the receiving device 2050 according to processed information. Further, the relay UE 1210 and/or the eNB 1230 may also be expressed as the transmitting device 200 or the receiving device 2050 according to the processed information.

The illustrated transmitting device 200 includes a processor 2010, a memory 2020, and a transceiver 2030. Similarly, the illustrated receiving device 2050 includes a processor 2060, a memory 2070, and a transceiver 2080. The illustrated processor, memory, and transceiver may be implemented as separate chips, or at least two blocks/functions may be implemented through a single chip.

The transceivers 2030 and 2080 perform a transmitting/receiving operation of a signal.

The processors 2010 and 2060 may implement functions, processes, and/or methods proposed in this specification. The processors 2010 and 2060 may perform operations according to the aforementioned contents. The processors 2010 and 2060 may include an application-specific integrated circuit (ASIC), another chipset, a logic circuit, and a data processing device.

The memories 2020 and 2070 may include a read-only memory (ROM), a random access memory (RAM), a flash memory, a memory card, a storage medium, and/or other storage devices.

Figure 21:
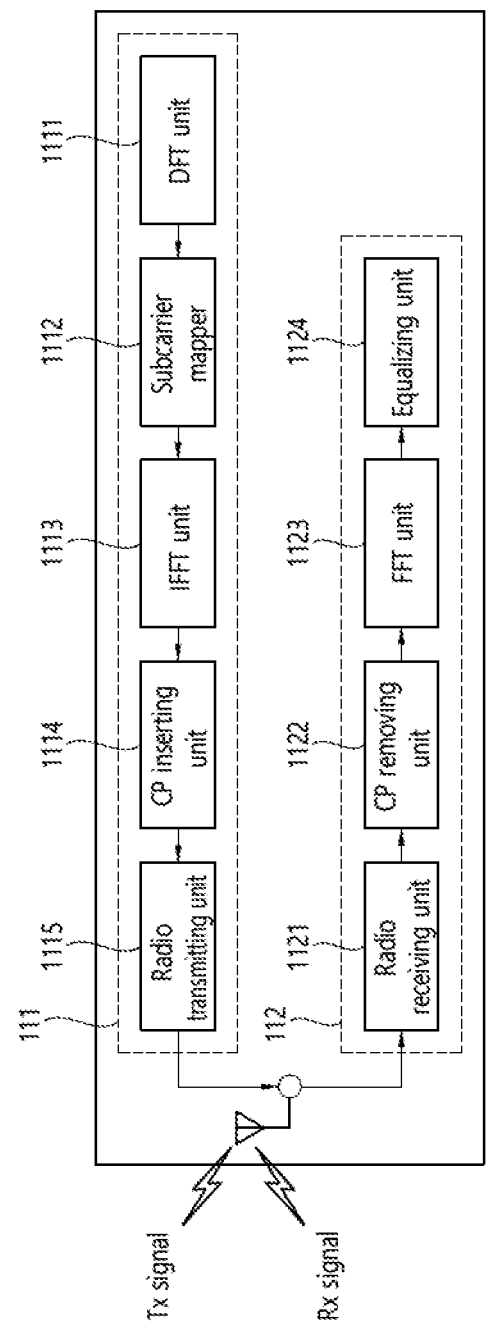

FIG. 21 is a detailed block diagram of a transceiver.

Referring to FIG. 21, the transceiver 110 includes a transmitting part 111 and a receiving part 112. The transmitting part 111 includes a discrete Fourier transform (DFT) unit 1111, a subcarrier mapper 1112, an IFFT unit 1113, a CP inserting unit 1114, and a wireless transmitting unit 1115. The transmitting part 111 may further include a modulator. Further, for example, the transmitting part 111 may further include a scramble unit, a modulation mapper (not illustrated), a layer mapper (not illustrated), and a layer permutator (not illustrated), which may be arranged before the DFT unit 1111. That is, in order to prevent an increase in peak-to-average power ratio (PAPR), the transmitting part 111 first passes information through the DFT unit 1111 before mapping a signal to a subcarrier. A signal spread (or precoded in the same sense) by the DFT unit 1111 is subcarrier-mapped through the subcarrier mapper 1112 and then made to a signal on a time axis through the inverse fast Fourier transform (IFFT) unit 1113.

The DFT unit 1111 performs DFT on the input symbols to output complex-valued symbols. For example, when Ntx symbols are input (however, Ntx is a natural number), the DFT size is Ntx. The DFT unit 1111 may be referred to as a transform precoder. The subcarrier mapper 1112 maps the complex-valued symbols to subcarriers in the frequency domain. The complex-valued symbols may be mapped to resource elements corresponding to resource blocks allocated for data transmission. The subcarrier mapper 1112 may be referred to as a resource element mapper. The IFFT unit 1113 performs IFFT on the input symbol and outputs a baseband signal for data, which is a time domain signal. The CP inserting unit 1114 copies a part of the rear part of the base band signal for data and inserts the copied rear part to the front part of the base band signal for data. Inter-symbol interference (ISI) and inter-carrier interference (ICI) are prevented through CP insertion, and orthogonality may be maintained in a multi-path channel.

On the other hand, the receiving part 112 includes a wireless receiving unit 1121, a CP removing unit 1122, an FFT unit 1123, and an equalizing unit 1124. The wireless receiving unit 1121, the CP removing unit 1122 and the FFT unit 1123 of the receiving part 112 perform a reverse function of the wireless transmitting unit 1115, the CP inserting unit 1114 and the IFFT unit 1113 of the transmitting part 111. The receiving part 112 may further include a demodulator.

What is claimed is:

1. A method for transmitting, by a remote terminal, a signal in a wireless network supporting a downlink and a sidelink, the method comprising:
   receiving downlink data from a base station through the downlink; and
   transmitting feedback information related with the downlink data to a relay terminal through the sidelink,
   wherein the downlink data is received by the remote terminal through at least one of downlink subframes preceding an (n-k)th subframe, where n and k each denotes an arbitrary positive integer,
   wherein the feedback information related with the downlink data is generated by the remote terminal in the (n-k)th subframe,
   wherein the feedback information related with the downlink data is transmitted to the relay terminal in an nth subframe, and
   wherein the feedback information related with the downlink data includes only ACK/NACK information for a downlink subframe received during a predetermined number of subframes preceding the (n-k)th subframe or only ACK/NACK information for the downlink subframe received during a predetermined subframe partition.

2. The method of claim 1, wherein the remote terminal does not receive the signal from the relay terminal through the sidelink and the remote terminal does not transmit the feedback information related with the downlink data to the base station through an uplink.

3. The method of claim 1, wherein the feedback information related with the downlink data includes Hybrid Automatic Repeat request (HARQ) information for the downlink data and the HARQ information for the downlink data includes a most recent ACK/NACK state corresponding to a specific HARQ process ID.

4. The method of claim 3, wherein the feedback information related with the downlink data further includes information on an HARQ process ID.

5. The method of claim 1, wherein the feedback information related with the downlink data includes channel status information (CSI) for the downlink.

6. The method of claim 1, wherein the feedback information related with the downlink data is transferred to the base station through the relay terminal.

7. The method of claim 1, wherein information on the subframe in which the feedback information related with the downlink data is transmitted to the relay terminal is transferred to the base station.

8. A remote terminal configured to transmit a signal a wireless network supporting a downlink and a sidelink, the remote terminal comprising:
   a transceiver; and
   a processor configured to control the transceiver,
   wherein the processor is further configured to:
   control the transceiver to receive downlink data from a base station through the downlink, and
   control the transceiver to transmit feedback information related with the downlink data to a relay terminal through the sidelink,
   wherein the downlink data is received by the remote terminal through at least one of downlink subframes preceding an (n-k)th subframe, where n and k each denote an arbitrary positive integer,
   wherein the feedback information related with the downlink data is generated by the remote terminal in the (n-k)th subframe,
   wherein the feedback information related with the downlink data is transmitted to the relay terminal in an nth subframe, and
   wherein the feedback information related with the downlink data includes only ACK/NACK information for a downlink subframe received during a predetermined number of subframes preceding the (n-k)th subframe or only ACK/NACK information for the downlink subframe received during a predetermined subframe partition.

9. The remote terminal of claim 8, wherein the remote terminal does not receive the signal from the relay terminal through the sidelink and the remote terminal does not transmit the feedback information related with the downlink data to the base station through an uplink.

10. The remote terminal of claim 8, wherein the feedback information related with the downlink data includes Hybrid Automatic Repeat request (HARQ) information for the downlink data and the HARQ information for the downlink data includes a most recent ACK/NACK state corresponding to a specific HARQ process ID.

11. The remote terminal of claim 10, wherein the feedback information related with the downlink data further includes information on an HARQ process ID.

12. The remote terminal of claim 8, wherein the feedback information related with the downlink data includes channel status information (CSI) for the downlink.

13. The remote terminal of claim 8, wherein the feedback information related with the downlink data is transferred to the base station through the relay terminal.

14. The remote terminal of claim 8, wherein information on the subframe in which the feedback information related with the downlink data is transmitted to the relay terminal is transferred to the base station.

15. The method of claim 1, wherein the remote terminal is configured to communicate with at least one a mobile terminal, a network, and/or an autonomous driving vehicle.

16. The remote terminal of claim 8, wherein the processor is configured to control the transceiver to communicate with at least one a mobile terminal, a network, and/or an autonomous driving vehicle.

* * * * *